United States Patent [19]

Edmonston et al.

[11] 4,387,863
[45] Jun. 14, 1983

[54] SPOOL ASSEMBLY

[75] Inventors: Donald R. Edmonston, Atlanta; Frederick R. Weaver, Snellville, both of Ga.

[73] Assignee: Western Electric Company, Inc., New York, N.Y.

[21] Appl. No.: 331,715

[22] Filed: Dec. 17, 1981

[51] Int. Cl.³ ............... B65H 75/12; B65H 75/28
[52] U.S. Cl. ...................... 242/118.4; 242/118.7; 242/125; 242/125.2
[58] Field of Search ............ 242/116, 117, 118, 118.4, 242/118.7, 118.8, 71.8, 77, 118.41, 125, 125.1, 242/125.2, 125.3

[56] References Cited

U.S. PATENT DOCUMENTS 2,859,000 11/1958 McLellan ............... 242/125.2
3,150,844 9/1964 Le Bus, Sr. ............ 242/117
3,358,943 12/1967 Pelson ................. 242/125.2
3,635,421 1/1972 Boland et al. .......... 242/118.7
3,966,139 6/1976 Terpak ................. 242/118.7

Primary Examiner—Leonard D. Christian
Attorney, Agent, or Firm—David P. Kelley

[57] ABSTRACT

A spool for receiving windings of elongated material, such as connectorized lightguide cable, is made of compressive and resilient material and has a flange on each end of a hub portion. Each flange has inner and outer rims of differing diameter and a clearance therebetween for forming a channel to hold a connector that terminates an end of the cable. The channel communicates with the surface of the hub via a flared groove for passing the cable ends from hub to channel. The spool is assembled by intermeshing two identical segments.

8 Claims, 5 Drawing Figures

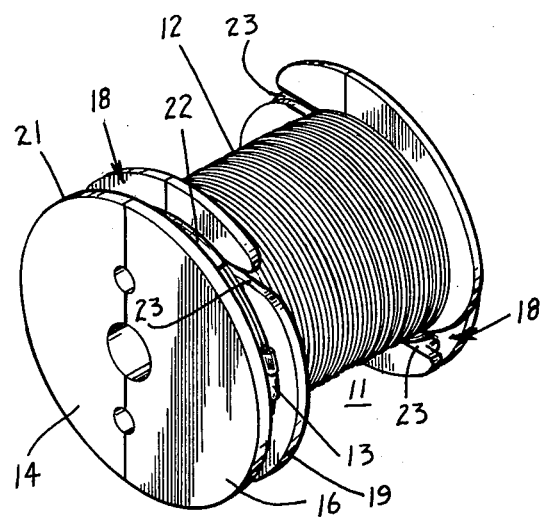
Fig_1
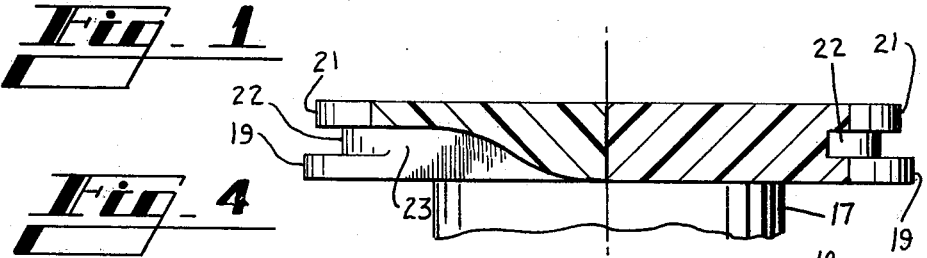
Fig_4
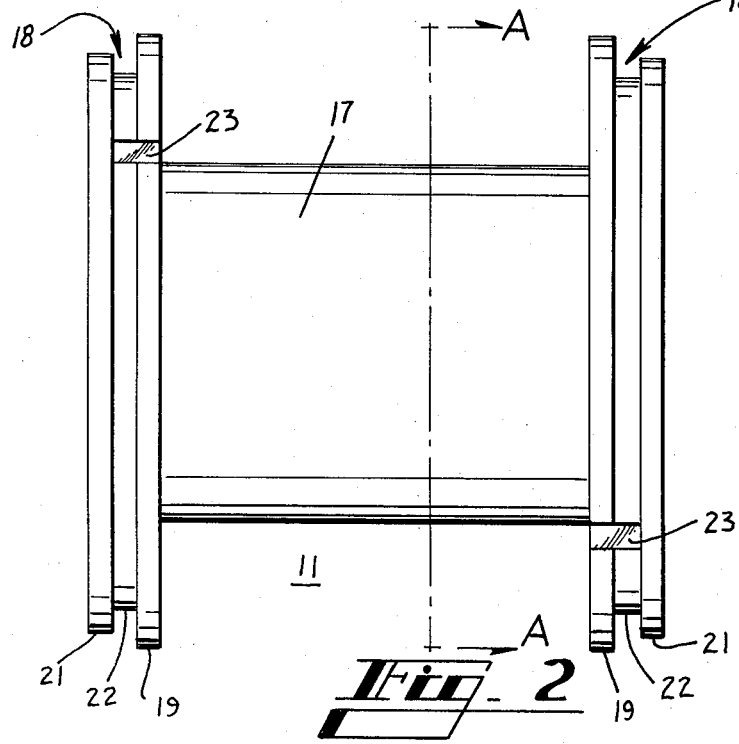
Fig_2

SPOOL ASSEMBLY

TECHNICAL FIELD

This invention relates to spools for receiving windings of elongated material, and, more particularly, to a spool for holding the windings of connectorized communications cable.

BACKGROUND OF THE INVENTION

In the manufacture of communications cables, and, more particularly, in the manufacture of single strand lightguide cable, it has become the practice to connectorize the ends of the cable as a final step prior to storing or shipping.

In the case of single strand lightguide cable, which is most often used as patch cord or jumper cable for a main distributor frame, as an interface between optical and electrical apparatus such as, for example, regenerators and signal coders, or as connecting means between individual optical signal processing elements, such as are used in data links, varying lengths of cable are used. Thus, where both ends of the cable are connectorized, and the cable wound on a spool, the necessity of supplying a multiplicity of lengths requires an inordinate number of spools, since, preferably, only one complete connectorized cable is wound on a spool. Clearly, therefore, it is almost a necessity that the spool be comparatively inexpensive, durable, and, if possible, light in weight.

In the case of any connectorized cable, but perhaps most acutely in the case of single fiber lightguide cable, the connector itself must be protected from damage during handling and shipping. This arises from the nature of optical fiber cable connecting or splicing. A typical single fiber lightguide or cable connector is shown in "Interconnection for Lightguide Fibers" by T. L. Williford, Jr. et al, *The Western Electric Engineer*, Winter 1980, pp. 89–90. From that article it can be seen that the basic elements of the connector are a plastic conical plug at the end of the fiber with the fiber itself centered inside the plug and a biconical sleeve which accepts two plugs and is designed to produce alignment of the axes of the fiber ends. The biconical sleeve is a precisely molded part which includes two truncated conical cavities that control the end separation and axial alignment of the fiber end faces which are encapsulated within the plugs that are seated in the conical cavities of the sleeve. This axial alignment of the fiber end faces is critical, hence, it is essential that the connectors be protected after being mounted on the cable ends, especially during handling of the cable wound spool, so that the ability of the connectors to align the fibers is not impaired.

It is also important that there be as little microbending loss as possible in the vicinity of the connector. For example, should the lightguide cable exiting from the connector be bent at an extreme angle to the axis of the connector, microbending losses exceeding an acceptable amount could be imparted to the cable. Wher it is desired or necessary to make measurements on the cable wound on the spool, such losses could seriously hamper the achievement of any meaningful results. In addition, too sharp a bend could result in permanent damage to the cable.

In the interests of efficiency and economy, a spool that can be easily assembled, used in the manufacturing process, handled, and shipped to the customer, and then broken down and destroyed or returned to the cable manufacturer is highly desirable. Examples of spools which are separable into two or more components are shown in U.S. Pat. No. 3,358,943 of E. Pelson and U.S. Pat. No. 3,635,421 of D. E. Boland et al. For reasons which will be apparent hereinafter, such spools as are shown in these patents would not be satisfactory for supporting a wound single fiber connectorized lightguide cable, even though they do possess the desirable feature of separability.

SUMMARY OF THE INVENTION

The present invention is a spool for use with communication cables, but primarily single fiber connectorized lightguide cable, meeting the foregoing enumerated desiderata which the existing art fails to do.

The spool of the invention is made of a suitable semi-rigid material, such as, for example, expanded polystyrene. In the context of this application, "semi-rigid" is meant to describe a material that is sufficiently stiff or rigid to maintain its shape under stress conditions such as occur in handling and shipping wound spools. On the other hand, the material is sufficiently compressible to permit wedging, for example, a connector in a groove therein, and thereafter gripping the connector firmly.

The spool comprises a mating pair of identical segments, wherein each segment comprises an elongated semicircular hub having at each end thereof a semicircular flange. Each flange comprises first and second peripheral rims separated by a region of lesser radius, thereby forming a groove or channel between the two rims. For reasons which will be readily apparent hereinafter, the radius of one of the rims is greater than the radius of the other rim. Cut or formed into that wall of each of the two semicircular flanges that is adjacent to the semicircular hub portion is a flared groove extending from the channel toward a point that is tangent to the hub. The depth of the flared groove also is tapered from a maximum at the channel opening into the groove to substantially zero at the point of tangency with the hub.

When the pair of segments are mated to form the spool there will be two flared grooves at either end of the elongated hub, each extending in opposite direction relative to the axis of the hub and to the groove directly opposite it in the other flange. The channel between the rims on each flange has a width slightly less than the outer dimension of a cable connector so that when a connector is wedged in the channel, it is gripped securely. The cable extending from the connector is to be passed into the flared groove to the hub, upon which it is wound. In like manner, the other end of the cable, after winding on the hub, is passed through the flared groove in the opposite flange to the channel where its connector is to be wedged and gripped firmly. In order that microbending losses can be minimized, the flare of the groove is chosen to produce a gentle change in direction of the cable in the channel to the cable in the groove. Where the connector is thus wedged, the larger diameter rim protects it from damage when, for example, the spool is rolled on its flanges.

DESCRIPTION OF THE DRAWINGS

Other features of the present invention will be more readily understood from the following detailed description of specific embodiments thereof when read in conjunction with accompanying drawings, in which:

FIG. 1 is a perspective view of the spool assembly of the present invention having a cable wound thereon;

FIG. 2 is an elevation view of the spool of the invention;

FIG. 4 is a sectional plan view along the line B—B of FIG. 3; and,

DETAILED DESCRIPTION

Figure 3:
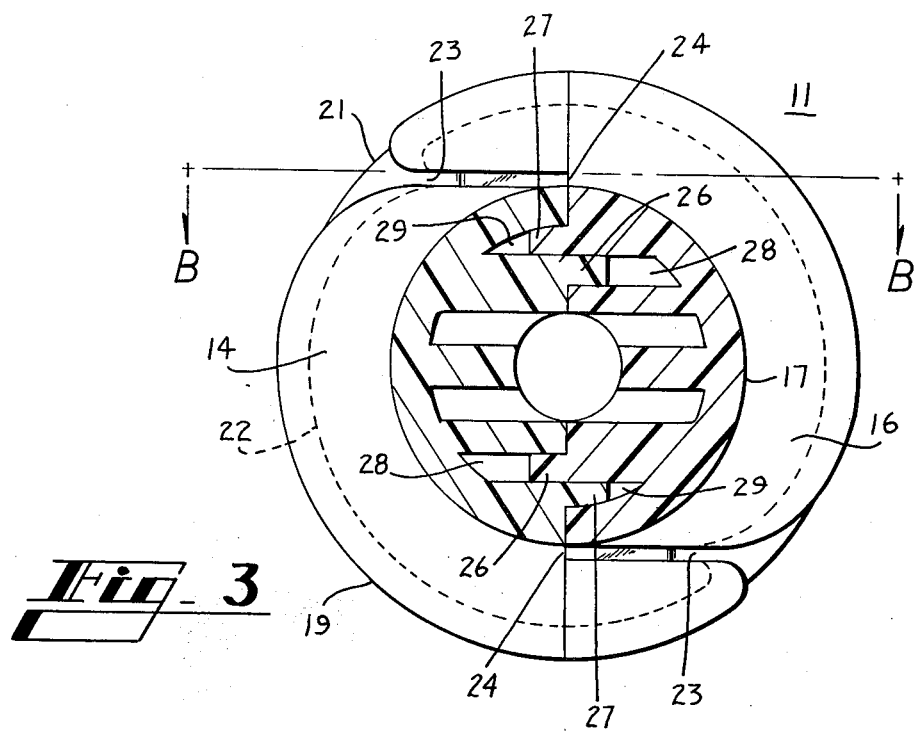
FIG. 3 is a sectional view in elevation along the line A—A of FIG. 2.

In FIG. 1 there is shown, in perspective the spool 11 of the present invention wound with, for illustrative purposes, a length of single strand lightguide cable 12, having connectors 13 at each end. Because of the perspective nature of the figure, the connector on one of the ends is hidden from view.

Referring to both FIG. 1 and FIG. 2 it can be seen that spool 11 comprises first and second segments 14 and 16 which are identical. Each spool segment comprises a semicircular hub 17, only one of which is visible in FIG. 2. At each end of the semicircular hub 17 is a flange 18 comprising a first peripheral rim 19 and a second peripheral rim 21 separated by a portion 22 of the flange having a diameter, or radius when considering only one segment, that is less than that of either rim 19 or rim 21, thereby forming a channel separating rims 19 and 21. As pointed out in the foregoing, the material of the spool is semi-rigid in nature, and is, for example, expanded polystyrene. When the width of the channel formed by portion 22 is of the order of 0.44 inch, it is just slightly less than the diameter of a connector as disclosed in the aforementioned Williford et al article so that where such a connector is forced into the channel, it is held securely in place.

In an actual embodiment of the invention, the two halves of the spool were molded of an expanded polystyrene with essentially closed cell construction and having a compressive strength (10% strain) of about 25 pounds per square inch, a compressive modulus of about 750 pounds per square inch, and a recovery of about 30%. In general, the material parameters may vary over fairly wide ranges, with compressive strength at 10% strain of 10 psi to 60 psi, compressive modulus from 300 psi to 2000 psi, and a recovery of greater than 5%. It is even possible that the material might vary from these ranges, so long as it meets the criteria for a semi-rigid material as set forth heretofore.

In FIG. 1 it can be seen that where a connectorized cable is to be wound on the spool, the connector or coupler 13 is wedged into the channel, the cable is wound on the hub, and the other end of the cable is passed through a flared groove 23 formed in the rim 19 and wedged in the channel formed between rims 19 and 21. The configuration of the flared grooves of the spool will be more readily apparent from FIGS. 3 and 4.

FIG. 3, which is a sectional view on the line A—A of FIG. 2, depicts not only the configuration of the grooves 23, but also the means by which two identical segments 14 and 16 are fitted together to form a spool 11. It can be seen in FIG. 3 that each groove 23 is formed in rim 19 extending from a point 24 tangent to hub 17 to the edge of rim 19. In order that microbending losses be minimized, it is necessary to eliminate as much as possible sharp corners or sudden changes in direction. To this end, rim 19 is curved from its outer edge into the groove, thereby producing a gentle curved flare at the outer end of the groove. In like manner, portion 22, as seen in dashed lines in FIG. 3, is also curved to produce a gradual transition from its outer surface to the outer end of the groove. In FIG. 4, which is a sectional view taken along the line B—B in FIG. 3, it can be seen that the groove 23 is also flared in the axial direction of the spool from the point 24 of tangency to surface of rim 21. As shown in FIG. 4, the flare comprises a gentle S-shaped curve, each arc of the S being, for example, approximately three inches in radius. However, it is not essential that the radii be three inches, or even that the configuration of the flare be S-shaped. What is desirable is that all transitions be as gentle as possible within the constraints imposed by the dimensions of the spool. Thus for a spool wherein the hub portion 17 is approximately six inches in length and three inches in radius, and rim 19 and portion 22 are five inches radius and four and three-eighths inches radius, respectively, the three inch radius for the arcs of the S-shaped flare serves adequately to minimize microbending losses.

The flared groove 23 in each flange permits affixing one end of the cable to be wound prior to winding, and affixing the other end after winding, for ready accessibility. With the spool of this invention, such positioning of the cable ends does not create undue bending stresses or subject the cable to possible damage. The accessibility of both ends facilitates measurement and connectorization procedures without removing the cable from the spool.

Figure 5:
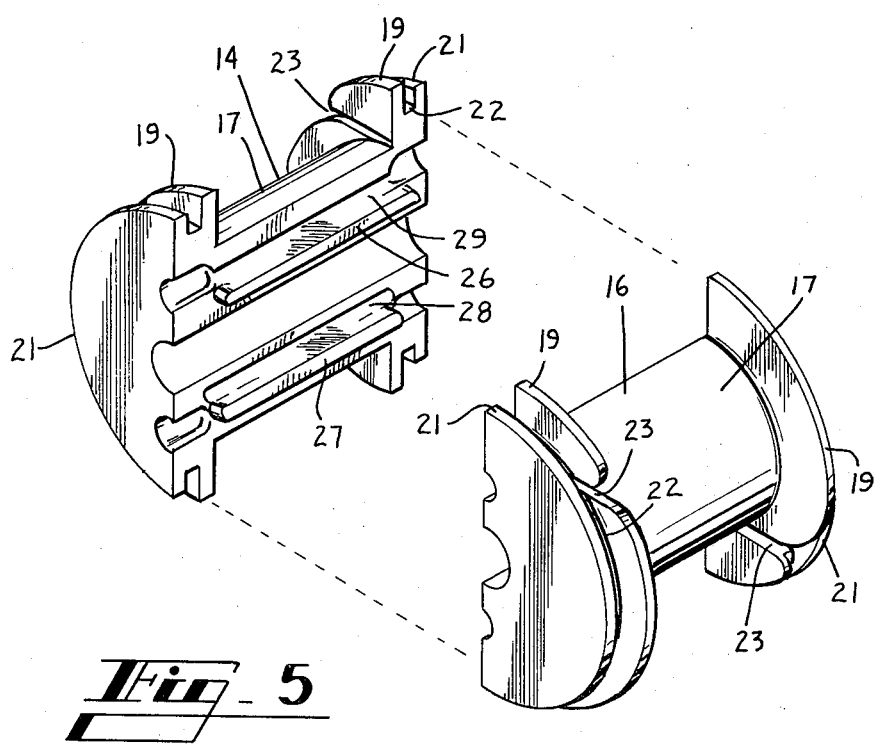
FIG. 5 is a perspective view of the segments of the spool prior to assembly.

The manner in which the segments 14 and 16 are fitted together to form a spool 11 can best be seen with reference to FIGS. 3 and 5. Segments 14 and 16 are identical with each other, and each is formed with two longitudinally extending ribs 26 and 27, with a longitudinally extending slot 28 immediately adjacent rib 27 and a longitudinally extending slot 29 immediately adjacent rib 26. Slots 28 and 29 of, for example, segment 14 are shaped to receive ribs 26 and 27 respectively of segment 16 in a mold press fit so that when the segments are fitted together, the compressive and resilient characteristics of the material of which they are made tend to hold them together. For greater reliability or permanency, they may be taped or cemented together.

The foregoing description of the invention has been in terms of a preferred embodiment thereof directed primarily to the use of lightguide cable. Various changes or modifications may be made by those skilled in the art without departure from the principles of the invention, such as, for example, the use of these principles with other types of wire, cable, or stranded material, as well as fiber material.

What is claimed is:

1. A spool adapted to hold one or more windings of an elongated material having at least one end terminated with a connector, said spool comprising:
   a circular hub having a first circular flange at one end thereof and a second circular flange at the other end thereof, each of said flanges comprising first and second peripheral rims, one of said rims being of greater diameter than the other rim, means forming a channel between said rims comprising a region of lesser diameter than said rims; and
   the rim closer to the hub in each of said flanges having a flared groove therein extending from said channel to a point tangent to the hub, the groove in the rim of said first flange extending in a direction opposite to the groove in the rim of said second flange.

2. A spool as claimed in claim 1, wherein said spool comprises first and second substantially identical segments of semi-rigid material, said segments being formed to mate with each other to form a unitary spool, each of said segments having a semicircular hub and a semicircular flange at each end thereof.

3. A spool as claimed in claim 1, wherein the width of the channel in each of said flanges is slightly less than the maximum outside dimension of the connector on the end of the elongated material said spool is adapted to hold.

4. A spool as claimed in claim 1, wherein each of said flared grooves is tapered from a maximum depth at its channel end to a minimum depth at the point of tangency with the hub.

5. A spool as claimed in claim 1, wherein the peripheral rims adjacent said hub are of greater diameter than the peripheral rims separated therefrom by the channel.

6. A spool as claimed in claim 2, wherein said semi-rigid material is expanded polystyrene.

7. A spool assembly as claimed in claim 2, wherein each of said segments includes a semicircular opening extending therethrough, the locus of the radius of said opening forming the locus of the radii of said hub and said flanges, longitudinally extending rib members on either side of said opening, and longitudinally extending slots adjacent said rib members.

8. A spool assembly as claimed in claim 7, wherein the rib on one side of said opening is closer to the said opening than its adjacent slot, and the slot on the other side of said opening is closer to said opening than its adjacent rib, whereby the slots in one of said segments are adapted to receive the ribs in the other of said segments when said segments are mated to form a spool.

* * * * *